US010912012B2

(12) United States Patent
Chakraborty et al.

(10) Patent No.: US 10,912,012 B2
(45) Date of Patent: Feb. 2, 2021

(54) INITIAL NETWORK ACCESS FOR DOWNLINK UNLICENSED DEPLOYMENT

(71) Applicant: QUALCOMM INCORPORATED, San Diego, CA (US)

(72) Inventors: Kaushik Chakraborty, San Diego, CA (US); Xiaoxia Zhang, San Diego, CA (US); Jing Sun, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/446,120

(22) Filed: Jun. 19, 2019

(65) Prior Publication Data
US 2020/0008131 A1 Jan. 2, 2020

Related U.S. Application Data

(60) Provisional application No. 62/691,972, filed on Jun. 29, 2018.

(51) Int. Cl.
H04W 48/10 (2009.01)
H04W 16/14 (2009.01)
(Continued)

(52) U.S. Cl.
CPC ........... *H04W 48/10* (2013.01); *H04W 16/14* (2013.01); *H04W 16/28* (2013.01); *H04W 24/08* (2013.01);
(Continued)

(58) Field of Classification Search
CPC ..... H04W 48/10; H04W 16/14; H04W 16/28; H04W 24/08; H04W 72/0453; H04W 72/046; H04W 74/0808; H04W 74/0833
See application file for complete search history.

(56) References Cited

U.S. PATENT DOCUMENTS

2018/0376375 A1* 12/2018 Turtinen ............... H04W 48/14
2019/0174550 A1* 6/2019 Huang ............. H04W 74/0833

OTHER PUBLICATIONS

Ericsson: "On initial access, RRM, Mobility and RLM", 3GPP Draft; R1-1806254 on initial access, RRM, Mobility and RLM, 3rd Generation Partnership Project (3GPP), Mobile Competence Centre, 650, Route Des Lucioles, F-06921 Sophia-Antipolis Cedex, France, vol. RAN WG1, No. Busan, Korea; May 21, 2018-May 25, 2018, May 20, 2018, XP051441462, 8 Pages, Retrieved from the Internet: URL:http://www.3gpp.org/ftp/Meetings%5F3GPP%5FSYNC/ RAN1/Docs/ [retrieved on May 20, 2018], Section 2.4, 8 pages, Section 2.2.2, Section 2.2.3, Section 1.

(Continued)

*Primary Examiner* — Eric Myers
(74) *Attorney, Agent, or Firm* — Liem T. Do

(57) ABSTRACT

Wireless communications systems and methods related to initial network access in a network deployed over a downlink unlicensed band paired with one or more UL bands are provided. A first wireless communication device communicates, with a second wireless communication device in a downlink unlicensed band, a first broadcast communication signal during a discovery time period configured based on a network discovery configuration. The first broadcast communication signal includes a configuration for requesting a second broadcast communication signal when there is no second broadcast communication signal detected within the discovery time period. The first wireless communication device communicates, with the second wireless communication device, a request for the second broadcast communication signal based on the configuration. The first wireless communication device communicates, with the second wireless communication device in the downlink unlicensed band, the second broadcast communication signal outside of the discovery time period in response to the request.

30 Claims, 12 Drawing Sheets

(51) Int. Cl.
    *H04W 16/28*     (2009.01)
    *H04W 24/08*     (2009.01)
    *H04W 72/04*     (2009.01)
    *H04W 74/08*     (2009.01)

(52) U.S. Cl.
    CPC ..... *H04W 72/046* (2013.01); *H04W 72/0453* (2013.01); *H04W 74/0808* (2013.01); *H04W 74/0833* (2013.01)

(56) References Cited

OTHER PUBLICATIONS

International Search Report and Written Opinion—PCT/US2019/038207—ISA/EPO—dated Aug. 27, 2019.
Nokia et al., "On DL Signals and Channels for NR-U", 3GPP Draft; R1-1806106_DL Signals and Channels, 3rd Generation Partnership Project (3GPP), Mobile Competence Centre; 650, Route Des Lucioles; F-06921 Sophia-Antipolis Cedex ; France, vol. RAN WG1, No. Busan, Korea; May 21, 2018-May 25, 2018, May 11, 2018 (May 11, 2018), XP051461703, 8 Pages, Retrieved from the Internet: URL:http://www.3gpp.org/ftp/tsg%5Fran/WG1%5FRL1/TSGR1%5F93/Docs [Retrieved on May 11, 2018], Section 2.

\* cited by examiner

INITIAL NETWORK ACCESS FOR DOWNLINK UNLICENSED DEPLOYMENT

CROSS REFERENCE TO RELATED APPLICATIONS

The present application claims priority to and the benefit of U.S. Provisional Patent Application No. 62/691,972, filed Jun. 29, 2018, which is hereby incorporated by reference in its entirety as if fully set forth below and for all applicable purposes.

TECHNICAL FIELD

This application relates to wireless communication systems, and more particularly to reducing an initial network access delay in a network deployed over a downlink (DL) unlicensed band paired with one or more uplink (UL) licensed bands and/or one or more UL unlicensed bands.

Introduction

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR-unlicensed (NR-U) may refer to the deployment of an NR cell in an unlicensed spectrum. For example, an NR cell may be deployed in a standalone NR-U mode over one or more unlicensed frequency bands. NR-U may also support cell deployments using various combinations of unlicensed bands and licensed bands. For example, an NR cell may be deployed using carrier aggregation to combine an NR licensed band with an NR unlicensed band, where the NR licensed band may function as an anchor carrier or a primary cell (PCell) and the unlicensed band may function as a supplemental carrier or a secondary cell (SCell). The SCell may include an uplink (UL) component carrier and a downlink (DL) component carrier. Alternatively, the SCell may include a DL component carrier only. In another example, an NR cell may be deployed using dual connectivity between an LTE licensed band and an NR unlicensed band, where the LTE licensed band may function as a PCell and the NR unlicensed band may function as an SCell. In yet another example, an NR cell may be deployed in a DL unlicensed band and a UL licensed band.

When a network operates over a DL unlicensed band, initial network access operations can be challenging. To facilitate initial network accesses by UEs, a BS may periodically broadcast system information. However, the BS may or may not be able to transmit the broadcast system information depending on listen-before-talk (LBT) or clear channel assessment (CCA) results in the DL unlicensed band. The LBT failures or CCA failures can delay a UE in accessing the network.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, comprising communicating, by a first wireless communication device with a second wireless communication device in a downlink unlicensed band, a first broadcast communication signal during a discovery time period configured based on a network discovery configuration, the first broadcast communication signal includes a configuration for requesting a second broadcast communication signal when there is no second broadcast communication signal detected within the discovery time period; communicating, by the first wireless communication device with the second wireless communication device, a request for the second broadcast communication signal based on the configuration; and communicating, by the first wireless communication device with the second wireless communication device in the downlink unlicensed band, the second broadcast communication signal outside of the discovery time period in response to the request.

In an additional aspect of the disclosure, an apparatus comprising a transceiver configured to communicate, with a wireless communication device in a downlink unlicensed band, a first broadcast communication signal during a discovery time period configured based on a network discovery configuration, the first broadcast communication signal includes a configuration for requesting a second broadcast communication signal when there is no second broadcast communication signal detected within the discovery time period; communicate, with the wireless communication device, a request for the second broadcast communication signal based on the configuration; and communicate, with the wireless communication device in the downlink unlicensed band, the second broadcast communication signal outside of the discovery time period in response to the request.

In an additional aspect of the disclosure, a computer-readable medium having program code recorded thereon, the program code comprising code for causing a wireless communication device to communicate, with a second wireless communication device in a downlink unlicensed band, a first broadcast communication signal during a discovery time period configured based on a network discovery configuration, the first broadcast communication signal includes a configuration for requesting a second broadcast communication signal when there is no second broadcast communication signal detected within the discovery time period; code for causing the wireless communication device to communicate, with the second wireless communication device, a request for the second broadcast communication signal based on the configuration; and code for causing the wireless communication device to communicate, with the second wireless communication device in the downlink unlicensed band, the second broadcast communication signal outside of the discovery time period in response to the request.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
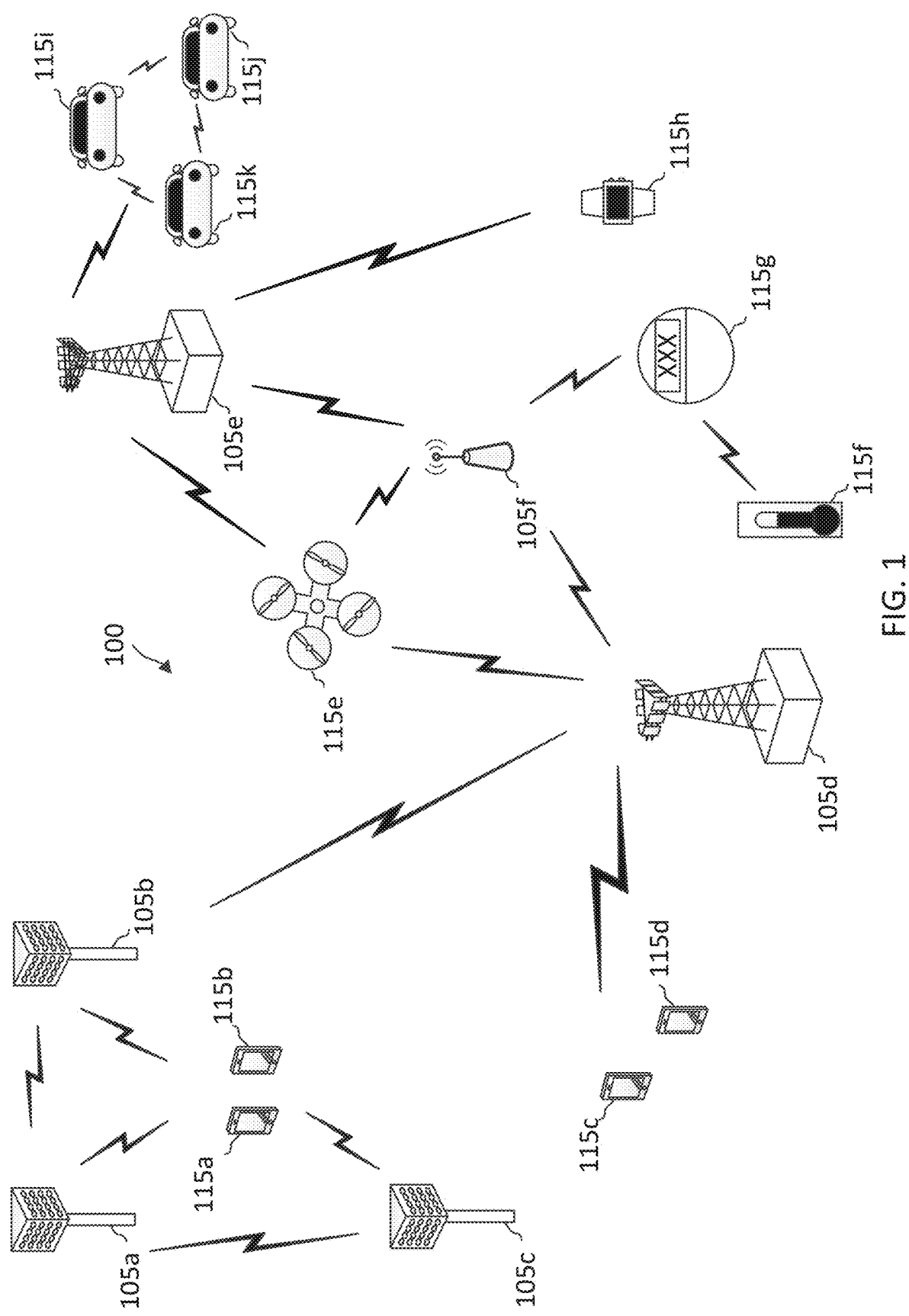
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for improving an initial network access latency in a network operating over a DL unlicensed band paired with one or more UL bands, which may include one or more UL licensed band and/or one or more UL unlicensed bands. A BS may transmit broadcast system information in a DL unlicensed band during preconfigured discovery time windows provided that the BS can gain access to the DL unlicensed band. The broadcast system information may include synchronization signal blocks (SSBs), remaining minimum system information (RMSI). An SSB may indicate monitoring occasions or opportunities for RMSI. A UE may initiate a network access after receiving SSBs and RMSI. The BS may allocate random access resources in the one or more UL bands for a UE to transmit a request for on-demand RMSI. The BS may include a configuration of the random access resources in an SSB.

In an embodiment, a UE may detect an SSB in a preconfigure discovery time window, but may fail to detect RMSI within the preconfigured discovery time window. The UE may transmit an on-demand RMSI request to the BS using the random access resources instead of delaying the monitoring till a next preconfigured discovery time window. The UE may monitor for RMSI outside of the preconfigured discovery window after transmitting the on-demand RMSI request. Upon receiving the on-demand RMSI request, the BS may transmit additional RMSI outside of the preconfigured discovery time window.

In an embodiment, the BS may transmit SSBs and/or RMSI in multiple beam directions during a preconfigured discovery time window. The BS may allocate random access resources in the one or more UL bands based for each beam direction and may include a configuration for the random access resources associated with the beam directions in an SSB. When a UE fails to detect RMSI after receiving an SSB in a preconfigured discovery time window, the UE may transmit an on-demand RMSI request using a random access resource corresponding to the same beam direction where the SSB is received. In response, the BS may transmit additional RMSI outside of the preconfigured discovery window in the same beam direction where the request is received. The provision for on-demand RMSI outside of a preconfigured discovery time window can reduce latency in initial network access when operating in a DL unlicensed band.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100 A UE 115 may also be a machine specifically configured for connected communication, including machine type communication (MTC), enhanced MTC (eMTC), narrowband IoT (NB-IoT) and the like. The UEs 115*e*-115*k* are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-hop configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In an embodiment, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some embodiments, a BS 105 may assign a pair of BWPs within the CC to a UE 115 for UL and DL communications. For example, the BWP pair may include one BWP for UL communications and one BWP for DL communications.

In an embodiment, the network 100 may operate over a shared channel, which may include shared frequency bands or unlicensed frequency bands, for example, at about 3.5 gigahertz (GHz), sub-6 GHz or higher frequencies in the mmWav band. In such an embodiment, the BSs 105 and the UEs 115 may be operated by multiple network operating entities. To avoid collisions, the BSs 105 and the UEs 115 may employ a listen-before-talk (LBT) procedure to monitor for transmission opportunity (TXOP) in the shared channel. For example, a BS 105 may perform an LBT in the shared channel. The BS 105 may perform the LBT by measuring signal energy in the channel and determining whether the channel is occupied based on an energy threshold comparison. Alternatively, the BS 105 may perform the LBT by monitoring for a certain predetermined signal (e.g., a preamble) that indicates a reservation in the channel. When the LBT passes, the BS 105 may schedule a UE 115 for communications over the shared channel during the TXOP.

In some embodiments, the network 100 may operate over a DL unlicensed band paired with a UL licensed band. In some other embodiments, the network 100 may operate over a DL unlicensed band paired with a UL unlicensed band. When the network 100 operates over a DL unlicensed band, the BS 105 may or may not be able to transmit system information broadcast (e.g., the SSBs, the RMSI, and/or the OSI) according to a preconfigured timeline gated by LBT failures in the DL unlicensed band. To account for potential LBT failures in the DL unlicensed band, the network 100 may configure a certain network discovery time window with multiple broadcast opportunities when a BS 105 may transmit the system information broadcast instead of using a fixed periodicity for the broadcast. Thus, a UE may monitor or search for the system information broadcast within the network discovery time window. However, LBT failures may still delay a UE in gaining initial network access. To reduce the initial network access delay due to potential LBT failures, the network 100 may allow a UE to request on-demand system information broadcast. Mechanisms for supporting on-demand system information broadcast are described in greater detail herein.

Figure 2:
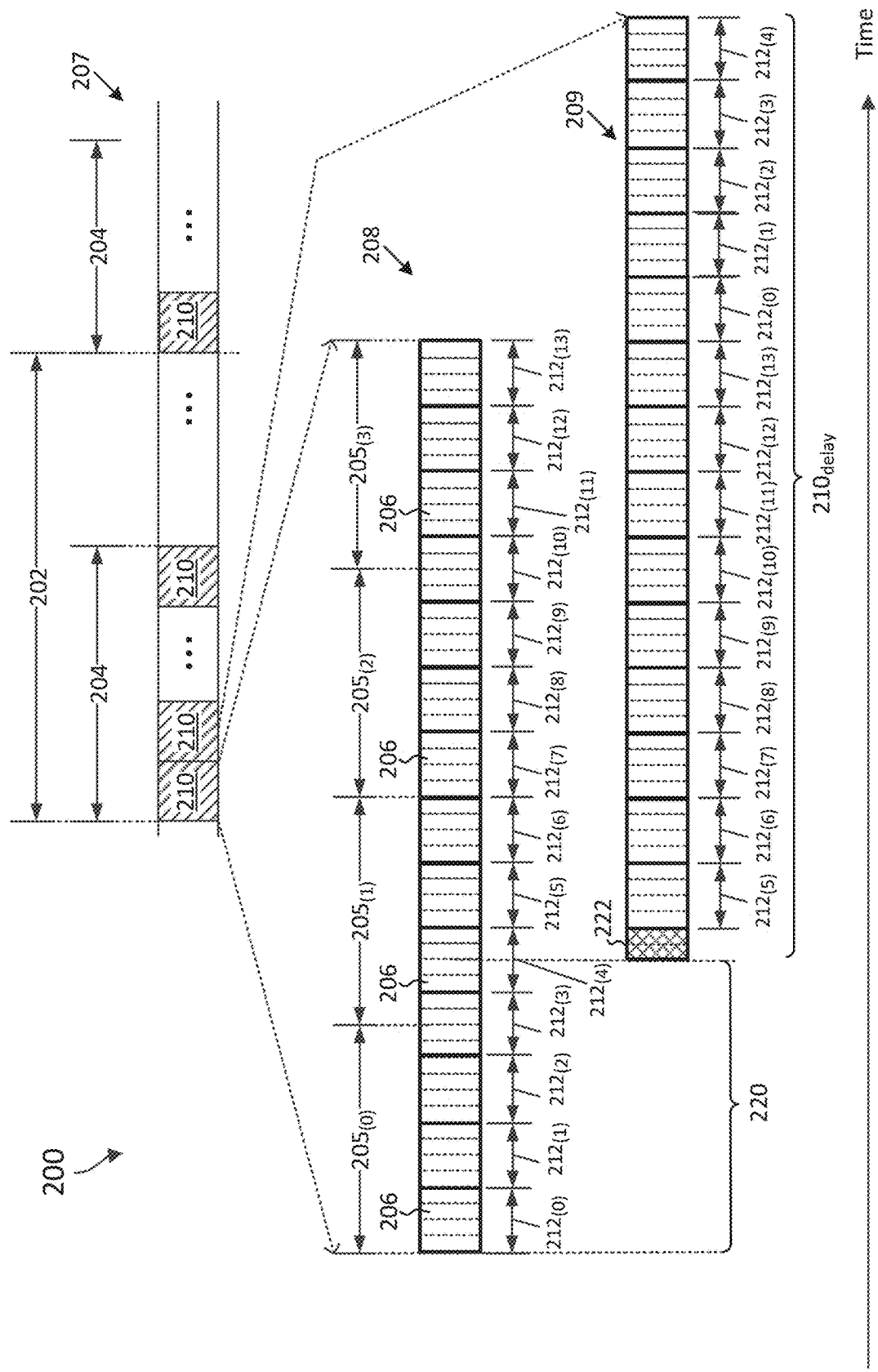
FIG. 2 illustrates a broadcast system information scheduling and transmission scenario according to some embodiments of the present disclosure.

FIG. 2 illustrates a broadcast system information scheduling and transmission scenario 200 according to some embodiments of the present disclosure. The scenario 200 may correspond to a system information scheduling and transmission scenario by a BS 105 in the network 100. In FIG. 2, the x-axis represents time in some constant units. The scenario 200 includes a discovery time period 204 with a periodicity 202 as shown by the timeline 207. A BS (e.g., the BSs 105) may transmit broadcast system information during the discovery time period 204 to facilitate a UE (e.g., the UEs 115) in performing an initial network access. The discovery time period 204 may also be referred to as a discovery reference signal measurement time configuration (DMTC) window. The discovery time period 204 and the periodicity 202 may include any suitable duration. In some embodiments, the discovery time period 204 may be about 5 ms and the periodicity 202 may be about 20 ms. The discovery time period 204 includes a plurality of synchronization signal (SS) burst transmission opportunities 210.

Each SS burst transmission opportunity 210 may include a plurality of SSB transmission opportunities 212 as shown by the expanded timeline 208.

As an example, each SS burst transmission opportunity 210 may span a time duration of about 0.5 ms. For a subcarrier spacing (SCS) of about 120 kHz, an SS burst transmission opportunity 210 may include about 4 slots 205, each including about 14 symbols 206. When an SSB transmission opportunity 212 includes about 4 symbols 206, an SS burst transmission opportunity 210 may include about 14 SSB transmission opportunities 212. The SSB transmission opportunities 212 are shown as $212_{(0)}$ to $212_{(13)}$. The SSB transmission opportunities 212 in an SS burst transmission opportunity 210 may be used by one or more BSs in the network for SSB transmissions (e.g., including a PSS, a SSS, and/or a PBCH signal). Accordingly, a UE attempting to access the network may monitor for broadcast system information during the discovery time period 204. The discovery time period 204 and/or the periodicity 202 may be predetermined and known by the BS and the UE.

In an embodiment, a BS may transmit a first SSB in the SSB transmission opportunity $212_{(2)}$ and may transmit a second SSB in the SSB transmission opportunity $212_{(4)}$. In an embodiment, a BS may transmit SSBs in multiple beam directions during different time to sweep through a certain spatial space. For example, the BS may transmit an SSB in a first beam direction during the SSB transmission opportunity $212_{(2)}$ and may repeat the transmission of the SSB in a second beam direction during the SSB transmission opportunity $212_{(3)}$. In an embodiment, BSs in the network may coordinate with each other to determine a schedule for transmitting SSBs using the SSB transmission opportunities 212.

When the BS operates in a shared communication medium (e.g., a DL unlicensed frequency band or a DL shared frequency band), the BS may perform a clear channel assessment (CCA) (e.g., an LBT) to contend for the medium prior to each transmission. When the medium is busy, some of the SSB transmission opportunities 212 may not be used. For example, the medium is busy for a time period 220 as shown by the timeline 209. Thus, the discovery time period 204 may be delayed by the time period 220. The BS may transmit a filler signal 222 to occupy the medium until the beginning of the SSB transmission opportunity $212_{(5)}$, for example, to align an SSB transmission to the SSB transmission opportunity $212_{(5)}$. A BS scheduled to transmit an SSB between the SSB transmission opportunity $212_{(0)}$ and the SSB transmission opportunity $212_{(4)}$ in the time period 220 may refrain from transmitting an SSB during the scheduled SSB transmission opportunity 212. Instead, the BS may wait till the next corresponding SSB transmission opportunity 212, for example, at the end of the delayed SS burst transmission opportunity $210_{delay}$.

While the scenario 200 illustrates the impact of LBT failures on SSB transmissions over a DL unlicensed band, LBT failures can have a similar impact on RMSI transmissions. Thus, LBT failures may result in delayed and/or missed SSB and/or RMSI transmissions. Since a UE may not proceed with an initial network access procedure until receiving RMSI from the BS, LBT failures can significantly increase the latency in initial network access.

Figure 3:
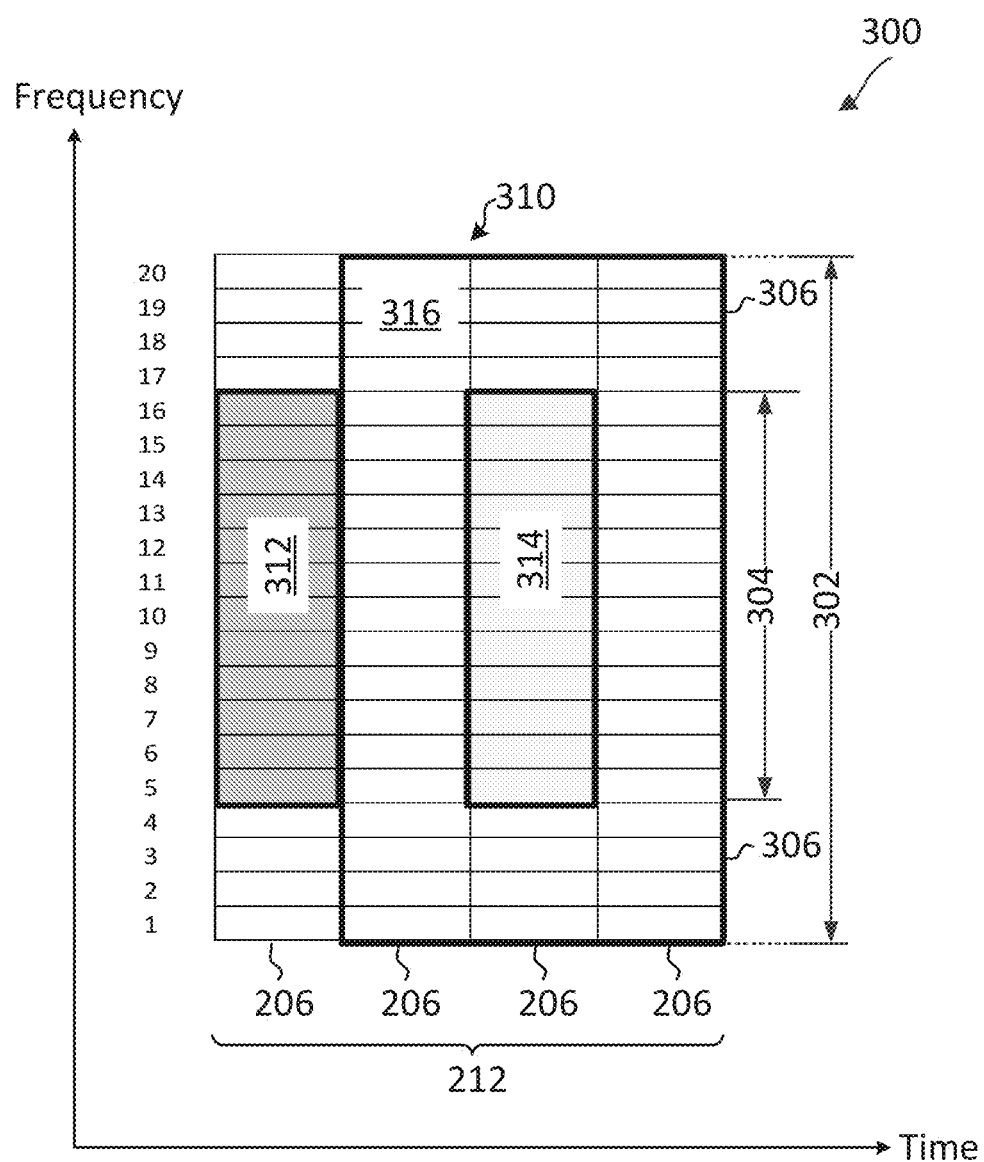
FIG. 3 illustrates a broadcast system information transmission scheme according to some embodiments of the present disclosure.

FIG. 3 illustrates a broadcast system information transmission scheme 300 according to some embodiments of the present disclosure. In FIG. 3, the x-axis represents time in some constant units and the y-axis represents frequency in some constant units. The scheme 300 may be employed by the network 100. In particular, a BS (e.g., the BSs 105) may employ the scheme 300 to transmit broadcast system information in the network. The scheme 300 may be used in conjunction with the scheduling described above in the scenario 200 with respect to FIG. 2 and may use the same reference numerals as in FIG. 2 for simplicity sake. For example, the BS may employ the scheme 300 to transmit an SSB in an SSB transmission opportunity 212.

In the scheme 300, a BS may transmit an SSB 310 including a PSS 312, an SSS 314, and a PBCH signal 316 (e.g., carrying a MIB) in an SSB transmission opportunity 212. The BS may transmit the SSB 310 in a frequency band 302 (e.g., including about 20 subcarriers 306). In some embodiments, the frequency band 302 may span a portion of a system operational frequency band. In some embodiments, the BS may transmit the PSS 312 and the SSS 314 over a portion 304 of the frequency band 302. A UE (e.g., the UEs 115) desiring to establish a connection with a BS in the network may monitor for broadcast system information in the frequency band 302.

Figure 4:
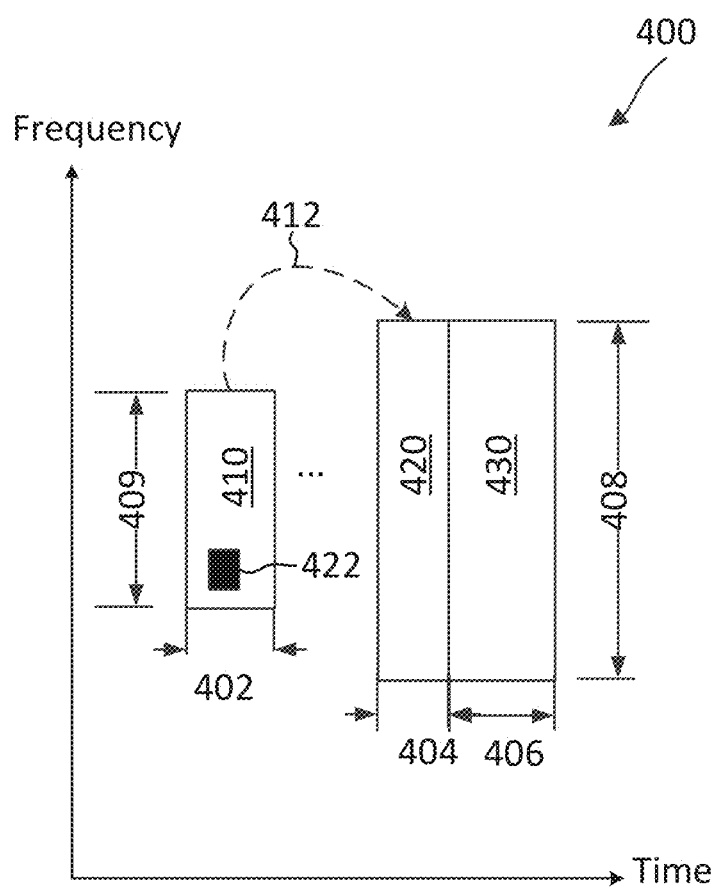
FIG. 4 illustrates a broadcast system information multiplexing scheme according to some embodiments of the present disclosure.
Figure 5:
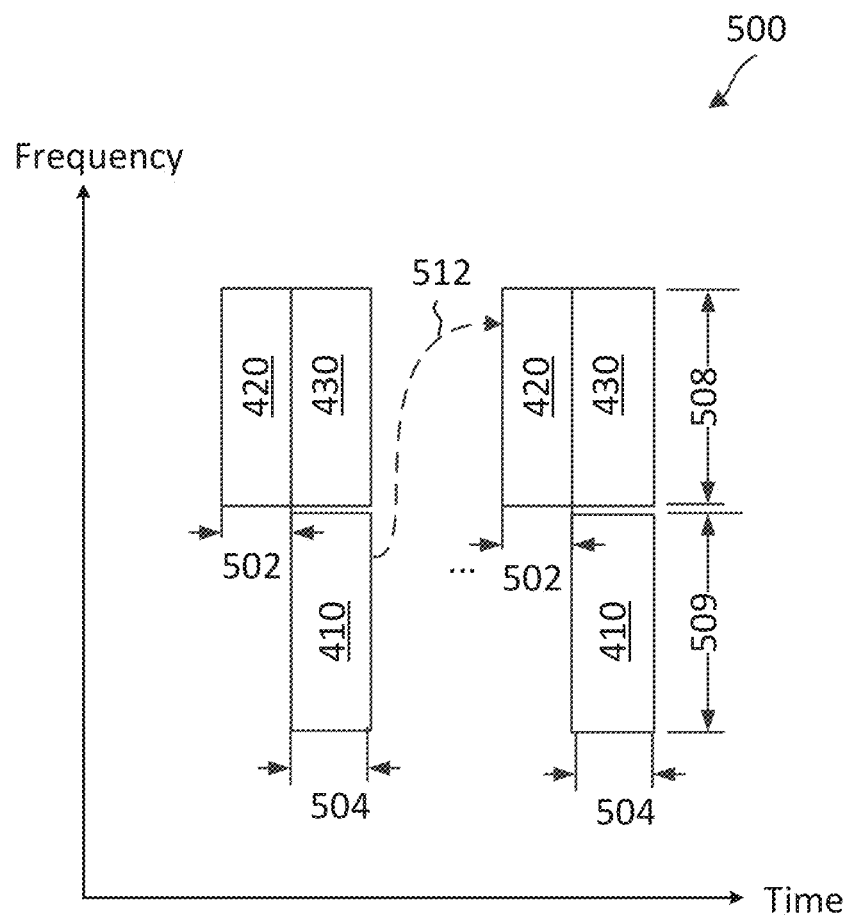
FIG. 5 illustrates a broadcast system information multiplexing scheme according to some embodiments of the present disclosure.
Figure 6:
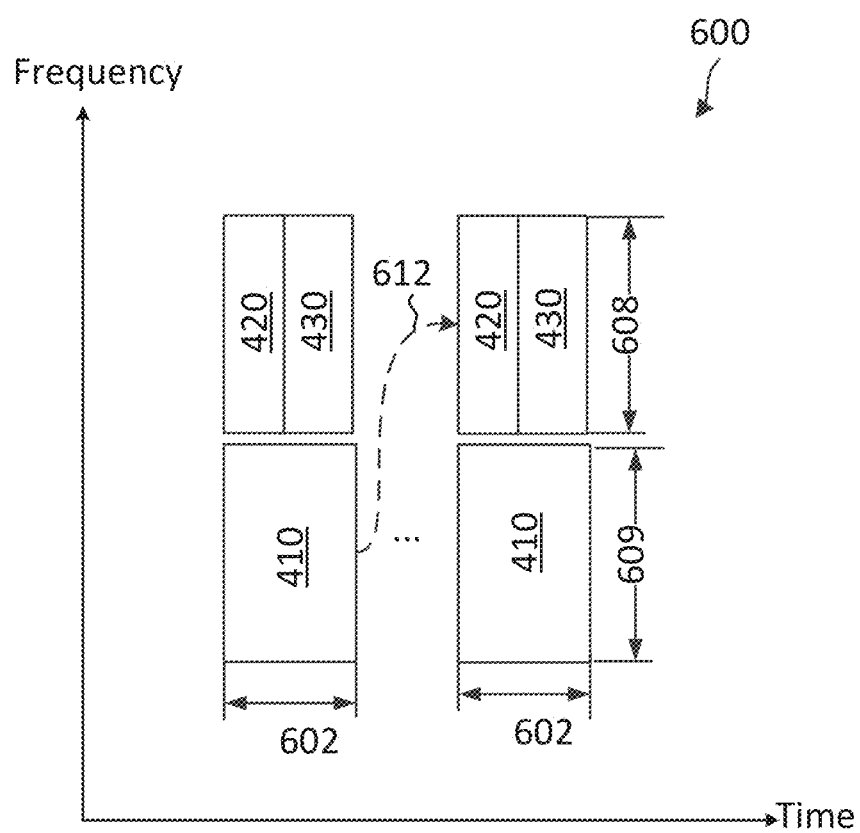
FIG. 6 illustrates a broadcast system information multiplexing scheme according to some embodiments of the present disclosure.

FIGS. 4-6 illustrate various mechanisms for multiplexing SSBs and RMSI. The RMSI may be carried in a PDSCH. The RMSI may be scheduled via a PDCCH (e.g., in a CORESET). The configuration information for an RMSI CORESET may be provided by a PBCH. In FIGS. 4-6, the x-axes represent time and the y-axes represent frequency.

FIG. 4 illustrates a broadcast system information multiplexing scheme 400 according to some embodiments of the present disclosure. The scheme 400 may be employed by the network 100. In particular, a BS (e.g., the BSs 105) may employ the scheme 400 to transmit SSBs and RMSI in the network. The scheme 400 may be used in conjunction with the scheduling and transmission mechanisms in the scenario 200 and the scheme 300 described above with respect to FIGS. 2 and 3, respectively.

The scheme 400 may multiplex an SSB 410 (e.g., the SSBs 310), a CORESET 420 for RMSI 430, and the RMSI 430 using time-division multiplexing (TDM) with overlapping bandwidths. The SSB 410, the RMSI CORESET 420, and RMSI 430 occur at different time periods 402, 404, and 406, respectively. The SSB 410 may be similar to the SSB 310. For example, the SSB 410 may include a PSS (e.g., the PSS 312), an SSS (e.g., the SSS 314), and a PBCH signal (e.g., the PBCH signal 316 carrying a MIB). The RMSI CORESET 420 may include one or more resource blocks (e.g., time-frequency resources) carrying a schedule 422 for the RMSI 430. The RMSI 430 may include one or more SIBs (e.g., the SIB 1 and/or SIB 2). The RMSI CORESET 420 and the RMSI 430 are located in an initial active DL BWP 408. The SSB 410 is located in a frequency band 409 overlapping with the initial active DL BWP 408. The SSB 410 may include a pointer, an indication, and/or a configuration (e.g., in a PBCH signal 316) indicating a PDCCH monitoring occasion (e.g., the CORESET 420) for the RMSI 430 as shown by the arrow 412.

FIG. 5 illustrates a broadcast system information multiplexing scheme 500 according to some embodiments of the present disclosure. The scheme 500 may be employed by the network 100. In particular, a BS (e.g., the BSs 105) may employ the scheme 400 to transmit SSBs and RMSI in the network. The scheme 500 may be used in conjunction with the scheduling and transmission mechanisms in the scenario 200 and the scheme 300 described above with respect to FIGS. 2 and 3, respectively. The scheme 500 is described using the same system information signals and resources as in the scheme 400 and may use the same reference numerals as in FIG. 4 for simplicity sake.

The scheme 500 may multiplex the SSB 410 with the RMSI CORESET 420 and the RMSI 430 using FDM. The RMSI CORESET 420 is located in an initial active DL BWP 508 during a time period 502. The RMSI 430 and the SSB 410 may be located at different frequencies during the same time period. As shown, the RMSI 430 is located in the initial active DL BWP 508 during a time period 504 and the SSB 410 is located in a frequency band 509 non-overlapping with the initial DL BWP 508 during the same time period 504. Similar to the scheme 400, the SSB 410 may include a pointer, an indication, and/or a configuration indicating a PDCCH monitoring occasion (e.g., the CORESET 420) for the RMSI 430 as shown by the arrow 512. In an embodiment, the scheme 500 may configure different transmission numerologies (e.g., different SCSs) for the SSB 410 and the RMSI CORESET 420.

FIG. 6 illustrates a broadcast system information multiplexing scheme 600 according to some embodiments of the present disclosure. The scheme 600 may be employed by the network 100. In particular, a BS (e.g., the BSs 105) may employ the scheme 400 to transmit SSBs and RMSI in the network. The scheme 400 may be used in conjunction with the scheduling and transmission mechanisms in the scenario 200 and the scheme 300 described above with respect to FIGS. 2 and 3, respectively. The scheme 600 is described using the same system information signals and resources as in the scheme 400 and may use the same reference numerals as in FIG. 4 for simplicity sake.

The scheme 600 may multiplex an SSB 410 (e.g., the SSBs 310) with the RMSI CORESET 420 and the RMSI 430 using FDM. The RMSI CORESET 420 and the RMSI 430 are located in an initial active DL BWP 608 during a time period 602. The SSB 410 is located in a frequency band 609 that is non-overlapping with the initial active DL BWP 608 during the same time period 602. Similar to the schemes 400 and 500, the SSB 410 may include a pointer, an indication, and/or a configuration indicating a PDCCH monitoring occasion (e.g., the CORESET 420) for the RMSI 430 as shown by the arrow 612. In an embodiment, the scheme 600 may configure the same transmission numerology for the SSB 410 and the RMSI CORESET 420.

Figure 7:
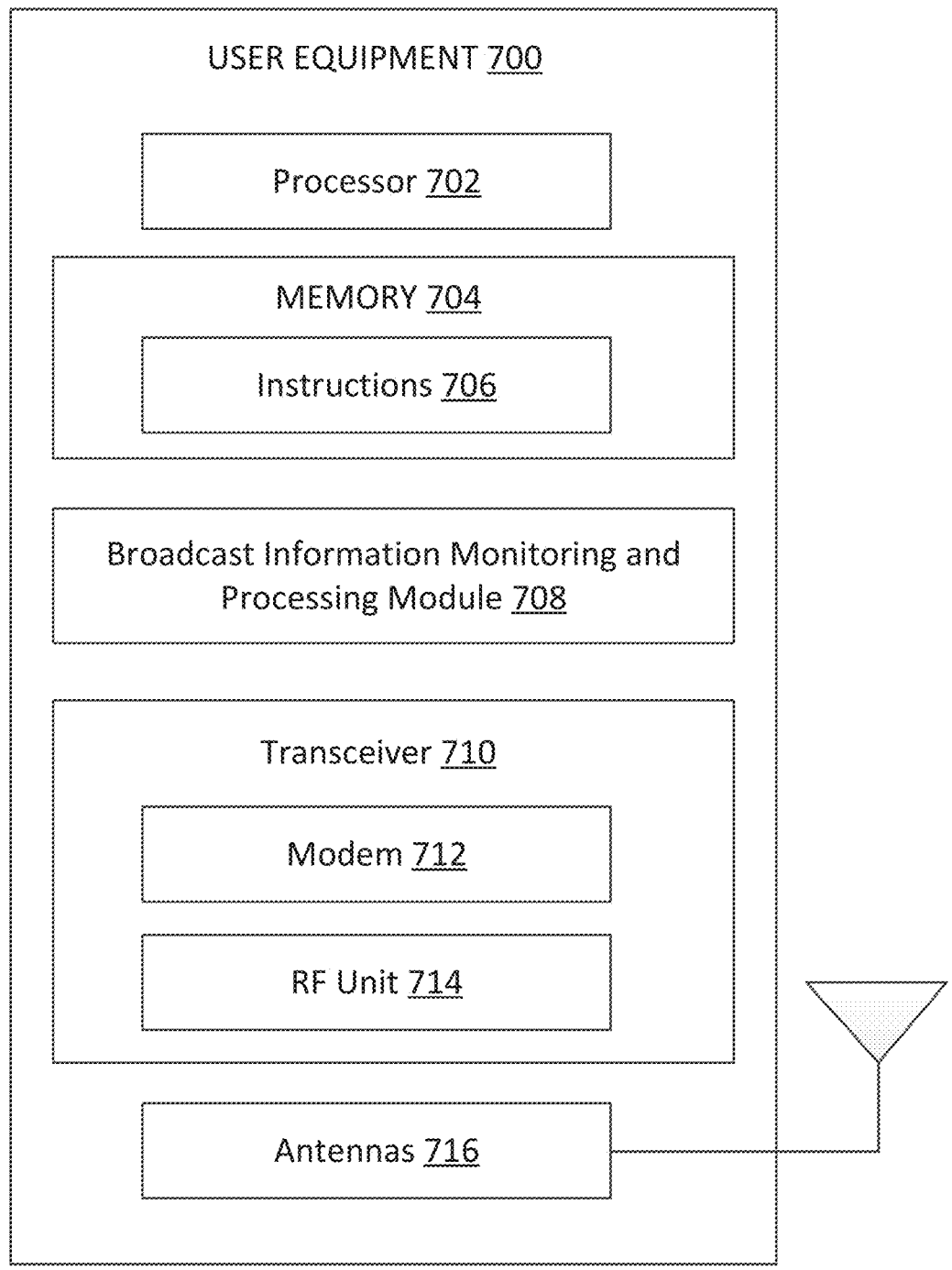
FIG. 7 is a block diagram of a user equipment (UE) according to some embodiments of the present disclosure.

FIG. 7 is a block diagram of an exemplary UE 700 according to some embodiments of the present disclosure. The UE 700 may be a UE 115 as discussed above in FIG. 1. As shown, the UE 700 may include a processor 702, a memory 704, a broadcast information monitoring and processing module 708, a transceiver 710 including a modem subsystem 712 and a radio frequency (RF) unit 714, and one or more antennas 716. These elements may be in direct or indirect communication with each other, for example via one or more buses.

The processor 702 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 704 includes a non-transitory computer-readable medium. The memory 704 may store instructions 706. The instructions 706 may include instructions that, when executed by the processor 702, cause the processor 702 to perform the operations described herein with reference to the UEs 115 in connection with embodiments of the present disclosure, for example, aspects of FIGS. 2-6 and 9-12. Instructions 706 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The broadcast information monitoring and processing module 708 may be implemented via hardware, software, or combinations thereof. For example, the broadcast information monitoring and processing module 708 may be implemented as a processor, circuit, and/or instructions 706 stored in the memory 704 and executed by the processor 702. The broadcast information monitoring and processing module 708 may be used for various aspects of the present disclosure, for example, aspects of FIGS. 2-6 and 9-12. For example, the broadcast information monitoring and processing module 708 is configured to monitor for broadcast system information (e.g., the SSBs 310 and 410, the RMSI 430, and/or OSI) from a BS (e.g., the BSs 105) in a DL unlicensed band based on a discovery time period (e.g., the discovery time period 204) and a discovery time period periodicity (e.g., the periodicity 202), synchronizes to the BS based on the broadcast system information, and/or perform an initial network access based on the broadcast system information. In an embodiment, the broadcast information monitoring and processing module 708 is further configured to receive an SSB in a discovery time period, obtain a PDCCH monitoring occasion (e.g., the CORESET 420) for RMSI from the SSB, obtain a RACH resource (e.g., in UL licensed bands and/or UL unlicensed bands) from the SSB, monitor for RMSI based on the PDCCH monitoring occasion during the discovery time period, transmit an on-demand RMSI request using the RACH resource when no RMSI is received (e.g., due to LBT failures at the BS), monitor for RMSI outside of the discovery time period, and/or receive RMSI outside of the discovery time period after transmitting the request. Mechanisms for performing on-demand RMSI request are described in greater detail herein.

As shown, the transceiver 710 may include the modem subsystem 712 and the RF unit 714. The transceiver 710 can be configured to communicate bi-directionally with other devices, such as the BSs 105. The modem subsystem 712 may be configured to modulate and/or encode the data from the memory 704, and/or the broadcast information monitoring and processing module 708 according to a modulation and coding scheme (MCS), e.g., a low-density parity check (LDPC) coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data from the modem subsystem 712 (on outbound transmissions) or of transmissions originating from another source such as a UE 115 or a BS 105.

The RF unit 714 may be further configured to perform analog beamforming in conjunction with the digital beamforming. Although shown as integrated together in transceiver 710, the modem subsystem 712 and the RF unit 714 may be separate devices that are coupled together at the UE 115 to enable the UE 115 to communicate with other devices.

The RF unit 714 may provide the modulated and/or processed data, e.g. data packets (or, more generally, data messages that may contain one or more data packets and other information), to the antennas 716 for transmission to one or more other devices. The antennas 716 may further receive data messages transmitted from other devices. The antennas 716 may provide the received data messages for processing and/or demodulation at the transceiver 710. The antennas 716 may include multiple antennas of similar or different designs in order to sustain multiple transmission links. The RF unit 714 may configure the antennas 716.

Figure 8:
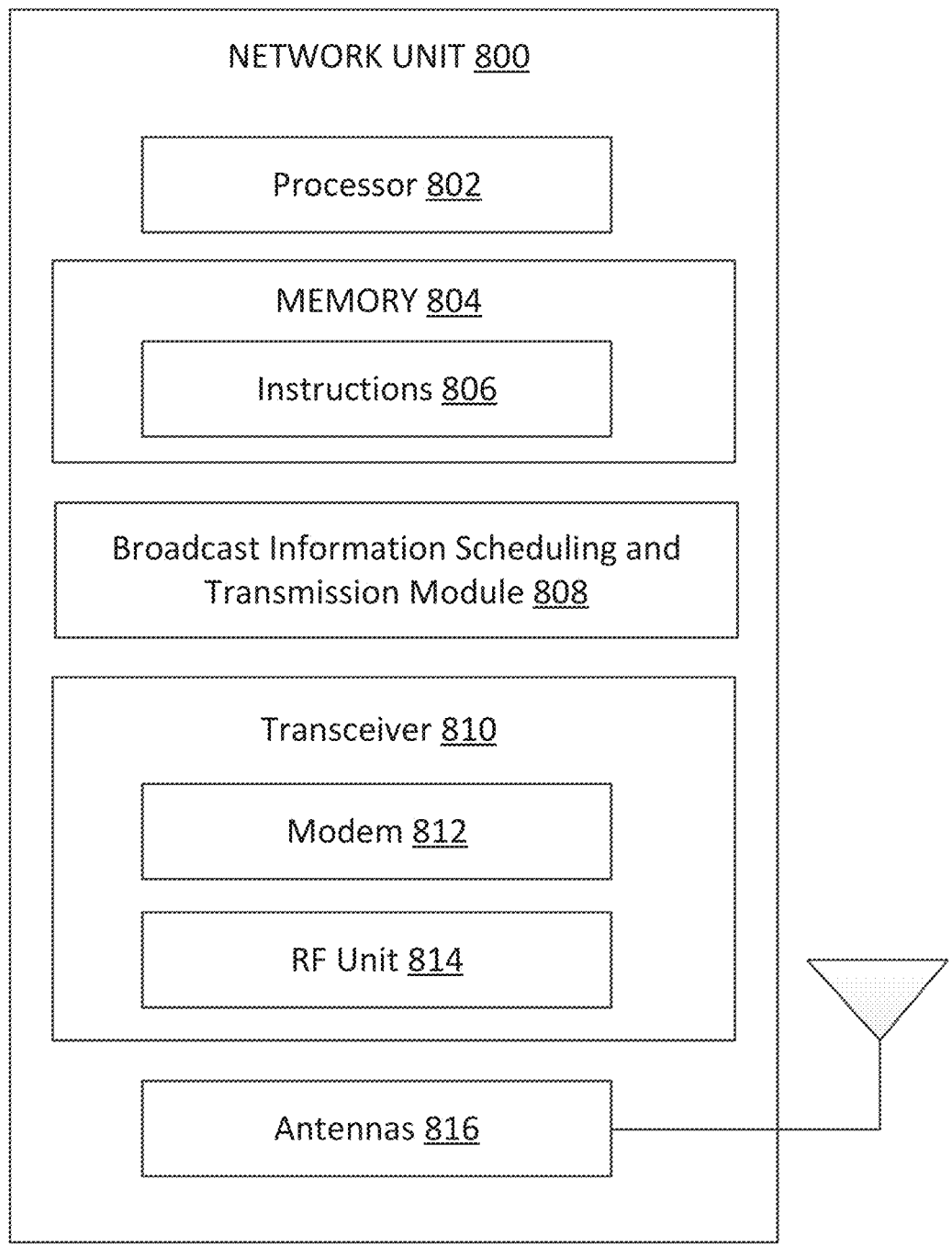
FIG. 8 is a block diagram of an exemplary base station (BS) according to some embodiments of the present disclosure.

FIG. 8 is a block diagram of an exemplary BS 800 according to some embodiments of the present disclosure. The BS 800 may be a BS 105 as discussed above in FIG. 1. A shown, the BS 800 may include a processor 802, a memory 804, a broadcast information scheduling and transmission module 808, a transceiver 810 including a modem subsystem 812 and a RF unit 814, and one or more antennas 816. These elements may be in direct or indirect communication with each other, for example via one or more buses.

The processor 802 may have various features as a specific-type processor. For example, these may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 804 may include a non-transitory computer-readable medium. The memory 804 may store instructions 806. The instructions 806 may include instructions that, when executed by the processor 802, cause the processor 802 to perform operations described herein, for example, aspects of FIGS. 2-6 and 9-12. Instructions 806 may also be referred to as code, which may be interpreted broadly to include any type of computer-readable statement(s) as discussed above with respect to FIG. 7.

The broadcast information scheduling and transmission module 808 may be implemented via hardware, software, or combinations thereof. For example, the broadcast information scheduling and transmission module 808 may be implemented as a processor, circuit, and/or instructions 806 stored in the memory 804 and executed by the processor 802. The broadcast information scheduling and transmission module 808 may be used for various aspects of the present disclosure, for example, aspects of FIGS. 2-6 and 9-12. For example, the broadcast information scheduling and transmission module 808 is configured to transmit broadcast system information (e.g., the SSBs 310 and 410, the RMSI 430, and/or OSI) in a DL unlicensed band based on a preconfigured discovery time period (e.g., the discovery time period 204) with a preconfigured periodicity (e.g., the periodicity 202) to allow a UE (e.g., the UEs 115) to synchronize and establish a connection with the BS 800, allocate RACH resources in one or more UL bands (e.g., including UL licensed bands and/or UL unlicensed bands) for the UE to request for on-demand RMSI, include a configuration of the RACH resources in the broadcast system information, perform LBTs prior to a broadcast system information transmission, monitor for on-demand RMSI request from UEs, and/or transmit RMSI upon receiving an on-demand RMSI request (e.g., outside of a discovery time period), as described in greater detail herein.

As shown, the transceiver 810 may include the modem subsystem 812 and the RF unit 814. The transceiver 810 can be configured to communicate bi-directionally with other devices, such as the UEs 115 and/or another core network element. The modem subsystem 812 may be configured to modulate and/or encode data according to a MCS, e.g., a LDPC coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data from the modem subsystem 812 (on outbound transmissions) or of transmissions originating from another source such as a UE 115 or 700. The RF unit 814 may be further configured to perform analog beamforming in conjunction with the digital beamforming. Although shown as integrated together in transceiver 810, the modem subsystem 812 and/or the RF unit 814 may be separate devices that are coupled together at the BS 105 to enable the BS 105 to communicate with other devices.

The RF unit 814 may provide the modulated and/or processed data, e.g. data packets (or, more generally, data messages that may contain one or more data packets and other information), to the antennas 816 for transmission to one or more other devices. This may include, for example, transmission of information to complete attachment to a network and communication with a camped UE 115 or 700 according to embodiments of the present disclosure. The antennas 816 may further receive data messages transmitted from other devices and provide the received data messages for processing and/or demodulation at the transceiver 810. The antennas 816 may include multiple antennas of similar or different designs in order to sustain multiple transmission links.

Figure 9:
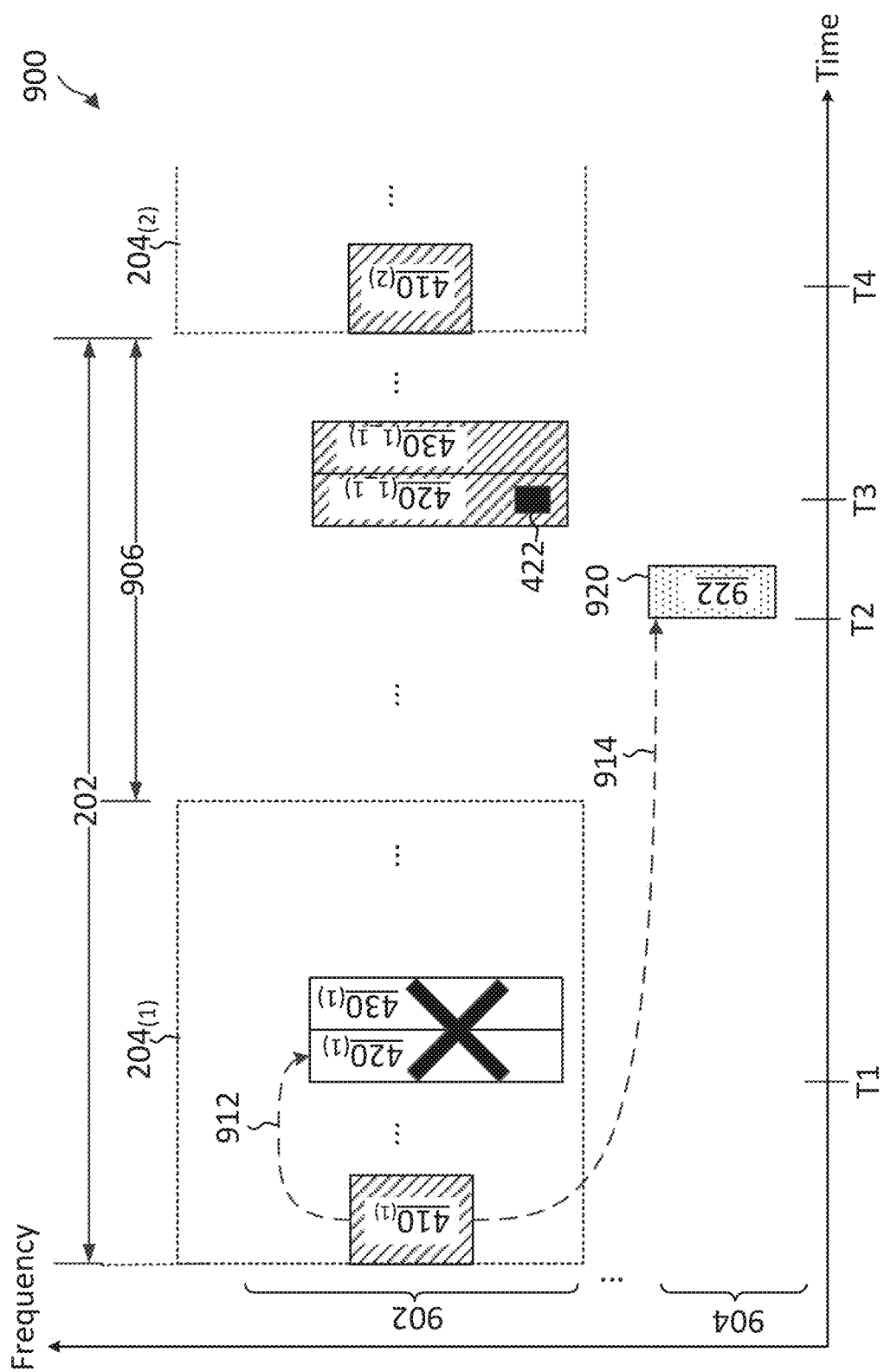
FIG. 9 illustrates an on-demand broadcast system information communication scheme according to some embodiments of the present disclosure.

FIG. 9 illustrates an on-demand broadcast system information communication scheme 900 according to some embodiments of the present disclosure. The scheme 900 may be employed by the network 100 operating over a DL unlicensed band 902 and a UL band 904. The UL band may be an unlicensed band or a licensed band. In particular, a BS such as the BSs 105 and 800 may employ the scheme 900 to provision for on-demand system information and a UE such as the UEs 115 and 700 may employ the scheme 900 to request for on-demand system information. The scheme 900 is illustrated using the multiplexing scheme 400 described above with respect to FIG. 4 and may use the same reference numerals as in FIG. 4 for simplicity sake.

In the scheme 900, a BS may transmit an SSB $410_{(1)}$ in the DL unlicensed band 902 during a discovery time period $204_{(1)}$. The BS may perform an LBT in the DL unlicensed band 902 with a channel clear status prior to the transmission. The SSB $410_{(1)}$ may include a configuration for an RMSI CORESET $420_{(1)}$ in the DL unlicensed band 902 within the discovery time period $204_{(1)}$ (e.g., at time T1) as shown by the arrow 912. The SSB $410_{(1)}$ may further include a configuration for a RACH resource 920 in the UL band 904 as shown by the arrow 914. The RACH resource 920 may be contention-free or contention-based. The configuration for the RACH resource 920 may include a time-frequency location of the resource 920, a periodicity of the RACH resource 920, and/or a preamble sequence configuration. The RACH resource 920 may be located in a time period 906 (e.g., at time T2) outside of the discovery time period $204_{(1)}$.

At time T1, the BS may perform an LBT in the DL unlicensed band 902 prior to transmitting RMSI $430_{(1)}$ and a corresponding schedule in the RMSI CORESET $420_{(1)}$. The DL unlicensed band 902 may be unavailable at the time (e.g., due to an active transmission of another node). Thus, the LBT may fail and the BS may refrain from transmitting the schedule in the RMSI CORESET $420_{(1)}$ and the RMSI $430_{(1)}$ as scheduled within the discovery time period $204_{(1)}$ as shown by the cross.

A UE may monitor for broadcast system information during the discovery time period $204_{(1)}$. The UE may detect the SSB $410_{(1)}$. The UE may extract the configuration for the RMSI CORESET $420_{(1)}$ and the configuration for the RACH resource 920 from the SSB $410_{(1)}$. After receiving the SSB $410_{(1)}$, the UE may monitor for RMSI from the BS based on the configuration for the RMSI CORESET $420_{(1)}$. The UE may fail to detect RMSI within the discovery time period 204 due to the LBT failure at the BS.

At time T2, after failing to detect RMSI in the discovery time period $204_{(1)}$, the UE may transmit an on-demand RMSI request 922 to the BS using the RACH resource 920. The on-demand RMSI request 922 may include a random access preamble sequence (e.g., based on the preamble sequence configuration) and/or a payload. At time T3, in response to the RMSI request 922, the BS may transmit a schedule 422 for RMSI $430_{(1\_1)}$ in the RMSI CORESET $420_{(1\_1)}$ and the RMSI $430_{(1\_1)}$ in the time period 906 outside of the discovery time period 204. For example, the BS may perform an LBT and may obtain a channel clear status prior to the transmissions of the RMSI CORESET $420_{(1\_1)}$ and the RMSI $430_{(1\_1)}$.

After transmitting the request 922, the UE may begin RMSI monitoring in the time period 906 outside of the discovery time period 204. The UE may detect the schedule 422 in the RMSI CORESET $420_{(1\_1)}$ and may receive the RMSI $430_{(1\_1)}$ based on the schedule 422.

After transmitting the RMSI $430_{(1\_1)}$, the BS may return to transmit an SSB $410_{(2)}$ in a next discover time period $204_{(2)}$ as scheduled provided that the BS can gain access (e.g., obtaining a successful LBT) to the DL unlicensed band 902.

In an embodiment, the BS may further include an expiration period for monitoring RMSI in an SSB 410. For example, after receiving the SSB $410_{(1)}$, the UE may monitor for RMSI for a period of time corresponding to the expiration period. When the UE fails to detect RMSI within the expiration period, the UE may transmit an on-demand RMSI request (e.g., the on-demand RMSI request 922).

In an embodiment, the BS may transmit the configuration for the RMSI CORESET 420 in a PBCH signal included in an SSB 410. In some other embodiments, the BS may transmit the configuration for the RMSI CORESET 420 in an extended PBCH signal included in an SSB 410.

In an embodiment, the BS may provision for multiple RACH resources 920 (e.g., multiple transmission opportunities), in different frequency subbands within the UL band 904 and/or in different time periods. A UE may select a RACH resource from the multiple RACH resources 920 based on certain criteria (e.g., such as channel measurements and/or LBT results). For example, when the UL band 904 is an unlicensed UL band, a UE failing to use a RACH resource 920 (e.g., in a particular subband and/or in a particular time period) may try to use another RACH resource 920.

Figure 10:
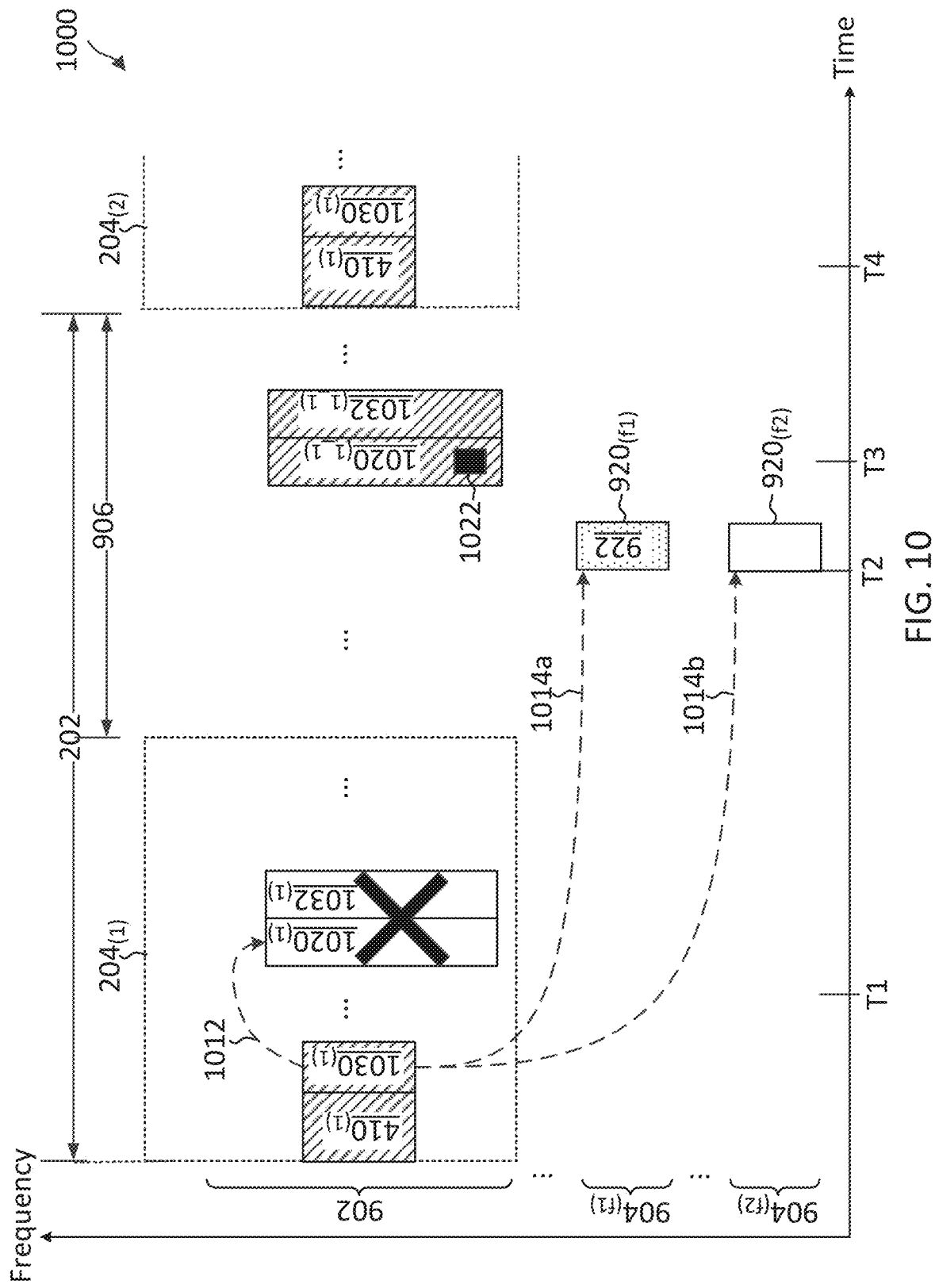
FIG. 10 illustrates an on-demand broadcast system information communication scheme according to some embodiments of the present disclosure.

FIG. 10 illustrates an on-demand broadcast system information communication scheme 1000 according to some embodiments of the present disclosure. The scheme 1000 may be employed by a network such as the network 100. In particular, a BS such as the BSs 105 and 800 may employ the scheme 1000 to provision for on-demand system information and a UE such as the UEs 115 and 700 may employ the scheme 1000 to request for on-demand system information. The scheme 1000 is substantially similar to the scheme 900, but the network may pair the DL unlicensed band 902 with multiple UL bands 904, which may include one or more UL unlicensed bands and/or one or more UL licensed bands. For simplicity of discussion and illustration, FIG. 10 illustrates two UL bands $904_{(1)}$ and $904_{(2)}$. However, the scheme 1000 may be scaled to include nay suitable number of UL bands (e.g., about 3, 4, 5, or more). FIG. 10 may use the same reference numerals as in FIGS. 4 and 9 for simplicity sake.

As described above, an SSB 410 may indicate schedules for monitoring RMSI 430 associated with the SSB 410. Since the scheme 1000 includes multiple UL bands 904, the RACH resource configuration may carry more information than in the scheme 900. Thus, in the scheme 1000, a BS may transmit the RMSI 430 in two parts, RMSI part 1 1030 and RMSI part 2 1032. The RMSI part 1 1030 may include less information than the RMSI part 2 1032. A BS may transmit RMSI part 1 1030 in the DL unlicensed band 902 as a separate signal from an SSB 410 associated with RMSI part 1 1030, for example, using resources near the SSB resources. The RMSI part 1 1030 may include critical information, such as scheduling information for monitoring RMSI part 2 1032 and a configuration for RACH resources 920 in each UL band 904 for on-demand RMSI requests.

As shown, the RMSI part 1 $1030_{(1)}$ may indicate an RMSI CORESET $1020_{(1)}$ (e.g., the RMSI CORESET 420) in the DL unlicensed band 902 within the discovery time period $204_{(1)}$ as shown by the arrow 1012. The RMSI part 1 $1030_{(1)}$ may indicate a RACH resource $920_{(1)}$ in the UL band $904_{(1)}$ as shown by the arrow 1014a and a RACH resource $920_{(2)}$ in the UL band $904_{(2)}$ as shown by the arrow 1014b. The RACH resources 920 in the different UL bands 904 may be in the same time period as shown or in different time periods.

A UE may monitor SSBs 410 and RMSI part 1 1030 in a discovery time period 204. Upon receiving an SSB $410_{(1)}$ and RMSI part 1 $1030_{(1)}$ in the discovery time period $204_{(1)}$, the UE may monitor for RMSI part 2 $1032_{(1)}$ in the discovery time period $204_{(1)}$ according to the RMSI part 1 $1030_{(1)}$. Similar to the scheme 900, upon failing to detect RMSI part 2 $1032_{(1)}$ in the discovery time window $204_{(1)}$, the UE may select a RACH resource 920 (e.g., the RACH resource $920_{(1)}$ in the UL band $904_{(1)}$ from one of the UL bands 904 and transmit an RMSI request 922 in the selected RACH resource 920. In response to the RMSI request 922, the BS may transmit RMSI part 2 $1032_{(1\_1)}$ outside of the discovery time window $204_{(1)}$. For example, the BS may transmit a schedule 1022 (e.g., the schedule 422) for the RMSI part 2 $1032_{(1)}$ in the RMSI CORESET $1020_{(1)}$ and may transmit the RMSI part 2 $1032_{(1)}$ according to the schedule 1022.

Figure 11:
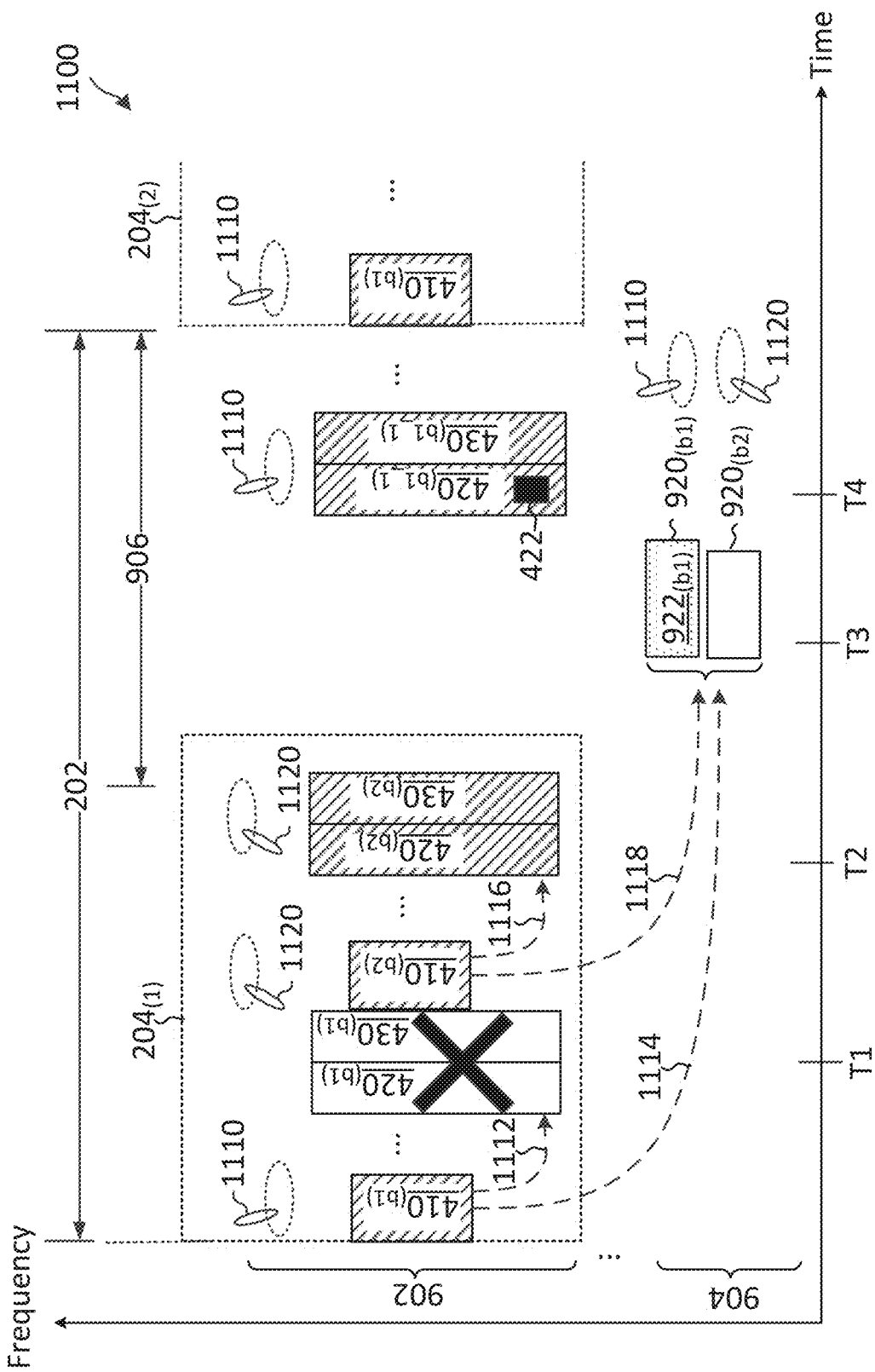
FIG. 11 illustrates an on-demand broadcast system information communication scheme according to some embodiments of the present disclosure.

FIG. 11 illustrates an on-demand broadcast system information communication scheme 1000 according to some embodiments of the present disclosure. The scheme 1100 may be employed by a network such as the network 100. In particular, a BS such as the BSs 105 and 800 may employ the scheme 1100 to provision for on-demand system information and a UE such as the UEs 115 and 700 may employ the scheme 1100 to request for on-demand system information. The scheme 1100 is substantially similar to the scheme 900 and further illustrates a BS transmitting broadcast system information over multiple beam directions. For example, the DL unlicensed band 902 may be in a mmWave band and the BS may employ massive-multiple input-multiple output (M-MIMO) for beamforming and transmissions. FIG. 11 may use the same reference numerals as in FIGS. 4 and 9 for simplicity sake.

In the scheme 1100, a BS may transmit multiple SSBs 410 in multiple beam directions within a discover time period 204, where each SSB 410 may include a configuration for an RMSI CORESET 420 in a corresponding beam direction and a configuration for RACH resources 920 in multiple beam directions. For simplicity of discussion and illustration, FIG. 11 illustrates two beam directions 1110 and 1120. However, the scheme 1100 may be scaled to include any suitable number of beam directions (e.g., about 3, 4, 5, or more). As shown, the BS transmits an SSB $410_{(b1)}$ in the beam direction 1110 and an SSB $410_{(b2)}$ in another beam direction 1120. The SSB $410_{(b1)}$ may include a configuration for an RMSI CORESET $420_{(b1)}$ in the beam direction 1110 (as shown by the arrow 1112) and a configuration for a RACH resource $920_{(b1)}$ (as shown by the arrow 1114) in the beam direction 1110 and a RACH resource $920_{(b2)}$ in the beam direction 1120. In some instances, the BS may associate each RACH resource 920 with a beam index corresponding to a beam direction. The RACH resources 920 in the different beam directions may be multiplexed in frequency as shown or multiplexed in time and/or frequency. Similarly, the SSB $410_{(b2)}$ may include a configuration for an RMSI CORESET $420_{(b2)}$ (as shown by the arrow 1116) in the beam direction 1120 and a configuration for the RACH resource $920_{(b2)}$ (as shown by the arrow 1118) in the beam direction 1110 and the RACH resource $920_{(b2)}$ in the beam direction 1120.

As an example, at time T1, the BS may contend for the DL unlicensed band 902 and may fail to gain access to the DL unlicensed band 902, and thus may refrain from transmitting RMSI $430_{(b1)}$ and a corresponding schedule in the beam direction 1110 as shown by the cross. At time T2, the BS may contend for the DL unlicensed band 902 and may gain access to the DL unlicensed band 902, and thus may proceed to transmit RMSI $430^{(b2)}$ and a corresponding schedule in the RMSI CORESET $420_{(b2)}$ in the beam direction 1120.

A UE may monitor for broadcast system information during the discovery time period $204_{(1)}$. The UE may obtain the configuration for the RMSI CORESET $420_{(b1)}$ and the configuration for the RACH resources 920 in the multiple beam directions from the SSB $410_{(b1)}$. The UE may detect the SSB $410_{(b1)}$ in the beam direction 1110. However, the UE may fail to detect RMSI (e.g., the RMSI $430_{(b1)}$) in the bean direction 1110 within the discovery time period 204 based on the SSB $410_{(b1)}$. Thus, at time T3, the UE may transmit an on-demand RMSI request $922_{(b1)}$ using the RACH resource $920_{(b1)}$ in the same first beam direction 1110 as where the SSB $410_{(b1)}$ is detected.

At time T4, in response to the RMSI request $922_{(b1)}$, the BS may transmit a schedule 422 for RMSI $430_{(b1\_1)}$ in the RMSI CORESET $420_{(b1\_1)}$ and the RMSI $430_{(b1\_1)}$ in the time period 906 outside of the discovery time period 204.

Similar to the scheme 900, the BS may transmit the configuration for the RMSI CORESET 420 in a PBCH signal included in an SSB 410. In some other embodiments, the BS may transmit the configuration for the RMSI CORESET 420 in an extended PBCH signal included in an SSB 410.

As can be seen from the schemes 900 and 1100, while a BS may fail to transmit RMSI within a discovery time period 204 (e.g., due to LBT failures), the transmission of the additional RMSI (e.g., the RMSI $430_{(1a)}$ and the RMSI $430_{(b1\_1)}$) outside of the discovery time period 204 can allow a UE to receive RMSI at an earlier time instead of waiting for a next discovery time period 204. Thus, the schemes 900 and 1100 can reduce the initial network access delay in a network operating over a DL unlicensed band.

Figure 12:
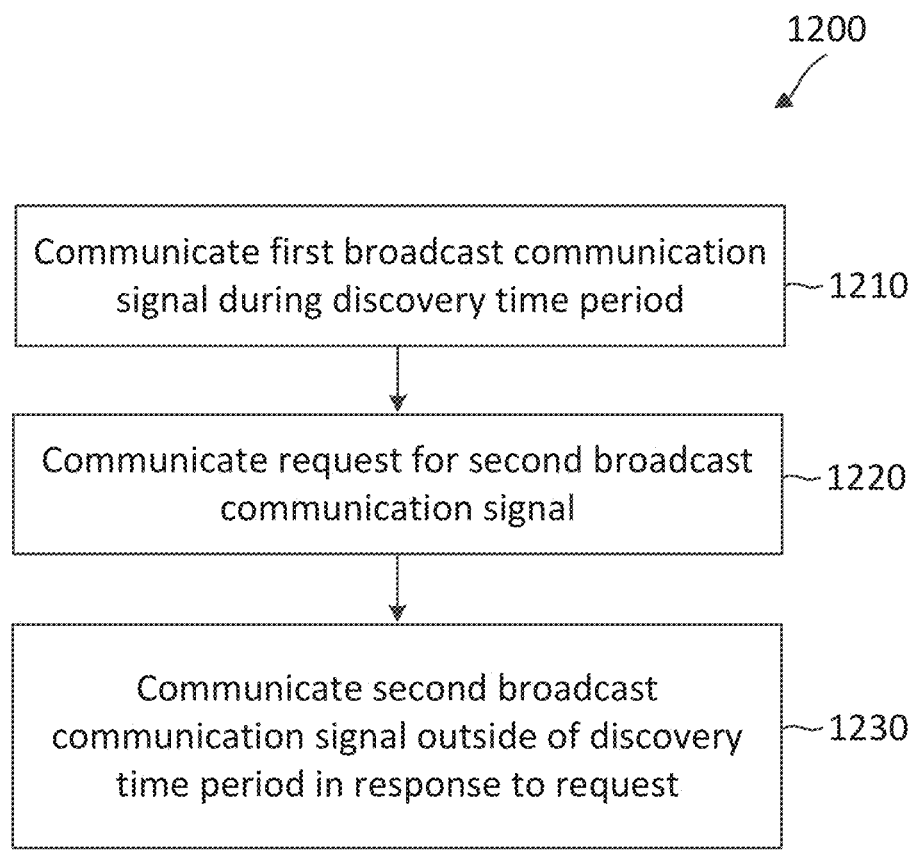
FIG. 12 is a flow diagram of an on-demand broadcast system information communication method according to some embodiments of the present disclosure.

FIG. 12 is a flow diagram of an on-demand broadcast system information communication method 1200 according to some embodiments of the present disclosure. Steps of the method 1200 can be executed by a computing device (e.g., a processor, processing circuit, and/or other suitable component) of a wireless communication device or other suitable means for performing the steps. For example, a wireless communication device, such as the UE 115 or UE 700, may utilize one or more components, such as the processor 702, the memory 704, the broadcast information monitoring and processing module 708, the transceiver 710, and the one or more antennas 716, to execute the steps of method 1200. In another example, a wireless communication device, such as the BS 105 or BS 800, may utilize one or more components, such as the processor 802, the memory 804, the broadcast information scheduling and transmission module 808, the transceiver 810, and the one or more antennas 816, to execute the steps of method 1200. The method 1200 may employ similar mechanisms as in the scenario 200 as described above with respect to FIG. 2 and the schemes 300, 400, 500, 600, and 900 described above with respect to FIGS. 3, 4, 5, 6, and 9, respectively. As illustrated, the method 1200 includes a number of enumerated steps, but embodiments of the method 1200 may include additional steps before, after, and in between the enumerated steps. In some embodiments, one or more of the enumerated steps may be omitted or performed in a different order.

At step 1210, the method 1200 includes communicating, by a first wireless communication device with a second wireless communication device in a downlink unlicensed band (e.g., the DL unlicensed band 902), a first broadcast communication signal (e.g., the SSBs 310 and 410) during a discovery time period (e.g., the discovery time period 204) configured based on a network discovery configuration. The first broadcast communication signal includes a configuration for requesting a second broadcast communication signal when there is no second broadcast communication signal detected within the discovery time period.

At step 1220, the method 1200 includes communicating, by the first wireless communication device with the second wireless communication device, a request (e.g., the on-demand RMSI request 922) for a second broadcast communication signal (e.g., the RMSI 430). In an embodiment, the request may be communicated in a UL licensed band. In another embodiment, the request may be communicated in a UL unlicensed band.

At step 1230, the method 1200 includes communicating, by the first wireless communication device with the second wireless communication device in the downlink unlicensed band, the second broadcast communication signal outside of the discovery time period (e.g., in the time period 906) in response to the request.

In an embodiment, the first wireless communication device may correspond to a UE and the second wireless communication device may correspond to a BS. In such an embodiment, the first wireless communication device may communicate the first broadcast communication signal and the second broadcast communication signal by receiving the first broadcast communication signal and the second broadcast communication signal, respectively, from the second wireless communication device. The first wireless communication device may communicate the request by transmitting the request to the second wireless communication device.

In another embodiment, the first wireless communication device may correspond to a BS and the second wireless communication device may correspond to a UE. In such an embodiment, the first wireless communication device may communicate the first broadcast communication signal and the second broadcast communication signal by transmitting the first broadcast communication signal and the second broadcast communication signal, respectively, to the second wireless communication device. The first wireless communication device may communicate the request by receiving the request from the second wireless communication device.

In an embodiment, the first broadcast communication signal may indicate one or more random access resources (e.g., the RACH resource 920) for communicating the request for the second broadcast communication signal. The one or more random access resources can be outside of the discovery time period. The first broadcast communication signal can further indicate a beam direction (e.g., the beam directions 1110 and 1120) for each of the one or more random access resources.

In an embodiment, when the first wireless communication device corresponds to a BS, the first wireless communication device may allocate the one or more random access resources for communicating the request for the second broadcast communication signal.

In an embodiment, when the first wireless communication device corresponds to a UE, the first wireless communication device may monitor for the second broadcast communication signal during the discovery time period based on the first broadcast communication signal. When there is no second broadcast communication signal detected within the discovery time period, the first wireless communication device may transmit the request.

In an embodiment, the first broadcast communication signal may include an expiration period for monitoring the second broadcast communication signal in the discovery time period. When the first wireless communication device corresponds to a UE, the first wireless communication device may monitor for the second broadcast communication signal during the discovery time period based on the first broadcast communication signal and may transmit the request when there is no second broadcast communication signal detected within the expiration period.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, comprising communicating, by a first wireless communication device with a second wireless communication device in a downlink unlicensed band, a first broadcast communication signal during a discovery time period configured based on a network discovery configuration, the first broadcast communication signal includes a configuration for requesting a second broadcast communication signal when there is no second broadcast communication signal detected within the discovery time period; communicating, by the first wireless communication device with the second wireless communication device, a request for the second broadcast communication signal based on the configuration; and communicating, by the first wireless communication device with the second wireless communication device in the downlink unlicensed band, the second broadcast communication signal outside of the discovery time period in response to the request.

In some embodiments, wherein the configuration indicates one or more random access resources for communicating the request for the second broadcast communication signal. In some embodiments, wherein the one or more random access resources are outside of the discovery time period. In some embodiments, wherein the first broadcast communication signal further indicates a beam direction for each of the one or more random access resources. In some embodiments, wherein the first broadcast communication signal is communicated in a first beam direction, and wherein the request is communicated using a first resource of the one or more random access resources corresponding to the first beam direction. In some embodiments, the method further comprises allocating, by the first wireless communication device, the one or more random access resources for communicating the request for the second broadcast communication signal. In some embodiments, wherein the communicating the request includes transmitting, by the first wireless communication device to the second wireless communication device, the request when there is no second broadcast communication signal detected within the discovery time period. In some embodiments, wherein the first broadcast communication signal includes an expiration period for monitoring for the second broadcast communication signal in the discovery time period. In some embodiments, wherein the communicating the request includes transmitting, by the first wireless communication device to the second wireless communication device, the request when there is no second broadcast communication signal detected within the expiration period. In some embodiments, wherein the communicating the request includes transmitting, by the first wireless communication device to the second wireless communication device, the request for the second broadcast communication signal, and wherein the communicating the second broadcast communication signal includes monitoring, by the first wireless communication device, for the second broadcast communication signal outside of the discovery time period after transmitting the request. In some embodiments, the method further comprises performing, by the first wireless communication device, a listen-before-talk (LBT) in the downlink unlicensed band during the discovery time period; and refraining, by the first wireless communication device, from transmitting the second broadcast communication signal in the downlink unlicensed band during the discovery time period based on the LBT. In some embodiments, wherein the request is communicated in an uplink licensed band. In some embodiments, wherein the request is communicated in an uplink unlicensed band. In some embodiments, wherein the first broadcast communication signal includes a synchronization signal block (SSB), and wherein the second broadcast communication signal includes remaining system information (RMSI).

Further embodiments of the present disclosure include an apparatus comprising a transceiver configured to communicate, with a wireless communication device in a downlink unlicensed band, a first broadcast communication signal during a discovery time period configured based on a network discovery configuration, the first broadcast communication signal includes a configuration for requesting a second broadcast communication signal when there is no second broadcast communication signal detected within the discovery time period; communicate, with the wireless communication device, a request for the second broadcast communication signal based on the configuration; and communicate, with the wireless communication device in the downlink unlicensed band, the second broadcast communication signal outside of the discovery time period in response to the request.

In some embodiments, wherein the configuration indicates one or more random access resources for communicating the request for the second broadcast communication signal. In some embodiments, wherein the one or more random access resources are outside of the discovery time period. In some embodiments, wherein the first broadcast communication signal further indicates a beam direction for each of the one or more random access resources. In some embodiments, wherein the first broadcast communication signal is communicated in a first beam direction, and wherein the request is communicated using a first resource of the one or more random access resources corresponding to the first beam direction. In some embodiments, the apparatus further comprises a processor configured to allocate the one or more random access resources for communicating the request for the second broadcast communication signal. In some embodiments, wherein the transceiver is further configured to communicate the request by transmitting, to the wireless communication device, the request when there is no second broadcast communication signal detected within the discovery time period. In some embodiments, wherein the first broadcast communication signal includes an expiration period for monitoring for the second broadcast communication signal in the discovery time period. In some embodiments, wherein the transceiver is further configured to communicate the request by transmitting, to the wireless communication device, the request when there is no second broadcast communication signal detected within the expiration period. In some embodiments, wherein the transceiver is further configured to communicate the request by transmitting, to the wireless communication device, the request for the second broadcast communication signal, and wherein apparatus further comprises a monitor configured to monitor for the second broadcast communication signal outside of the discovery time period after transmitting the request. In some embodiments, the apparatus further comprises a processor configured to perform a listen-before-talk (LBT) in the downlink unlicensed band during the discovery time period; and refrain from transmitting the second broadcast communication signal in the downlink unlicensed band during the discovery time period based on the LBT. In some embodiments, wherein the request is communicated in an uplink licensed band. In some embodiments, wherein the request is communicated in an uplink unlicensed band. In some embodiments, wherein the first broadcast communication signal includes a synchronization signal block (SSB), and wherein the second broadcast communication signal includes remaining system information (RMSI).

Further embodiments of the present disclosure include a computer-readable medium having program code recorded thereon, the program code comprising code for causing a wireless communication device to communicate, with a second wireless communication device in a downlink unlicensed band, a first broadcast communication signal during a discovery time period configured based on a network discovery configuration, the first broadcast communication signal includes a configuration for requesting a second broadcast communication signal when there is no second broadcast communication signal detected within the discovery time period; code for causing the wireless communication device to communicate, with the second wireless communication device, a request for the second broadcast communication signal based on the configuration; and code for causing the wireless communication device to communicate, with the second wireless communication device in the downlink unlicensed band, the second broadcast communication signal outside of the discovery time period in response to the request.

In some embodiments, wherein the configuration indicates one or more random access resources for communicating the request for the second broadcast communication signal. In some embodiments, wherein the one or more random access resources are outside of the discovery time period. In some embodiments, wherein the first broadcast communication signal further indicates a beam direction for each of the one or more random access resources. In some embodiments, wherein the first broadcast communication signal is communicated in a first beam direction, and wherein the request is communicated using a first resource of the one or more random access resources corresponding to the first beam direction. In some embodiments, the computer-readable medium further comprises code for causing the wireless communication device to allocate the one or more random access resources for communicating the request for the second broadcast communication signal. In some embodiments, wherein the code for causing the wireless communication device to communicate the request is further configured to transmit, to the second wireless communication device, the request when there is no second broadcast communication signal detected within the discovery time period. In some embodiments, wherein the first broadcast communication signal includes an expiration period for monitoring for the second broadcast communication signal in the discovery time period. In some embodiments, wherein the code for causing the wireless communication device to communicate the request is further configured to transmitting, to the second wireless communication device, the request when there is no second broadcast communication signal detected within the expiration period. In some embodiments, wherein the code for causing the wireless communication device to communicate the request is further configured to transmit, to the second wireless communication device, the request for the second broadcast communication signal, and wherein the code for causing the wireless communication device to communicate the second broadcast communication signal is further configured to monitor for the second broadcast communication signal outside of the discovery time period after transmitting the request. In some embodiments, the computer-readable medium further comprises code for causing the wireless communication device to perform a listen-before-talk (LBT) in the downlink unlicensed band during the discovery time period; and code for causing the wireless communication device to refrain from transmitting the second broadcast communication signal in the downlink unlicensed band during the discovery time period based on the LBT. In some embodiments, wherein the request is communicated in an uplink licensed band. In some embodiments, wherein the request is communicated in an uplink unlicensed band. In some embodiments, wherein the first broadcast communication signal includes a synchronization signal block (SSB), and wherein the second broadcast communication signal includes remaining system information (RMSI).

Further embodiments of the present disclosure include an apparatus comprising means for communicating, with a wireless communication device in a downlink unlicensed band, a first broadcast communication signal during a discovery time period configured based on a network discovery configuration, the first broadcast communication signal includes a configuration for requesting a second broadcast communication signal when there is no second broadcast communication signal detected within the discovery time period; means for communicating, with the wireless communication device, a request for the second broadcast communication signal based on the configuration; and means for communicating, with the wireless communication device in the downlink unlicensed band, the second broadcast communication signal outside of the discovery time period in response to the request.

In some embodiments, wherein the configuration indicates one or more random access resources for communicating the request for the second broadcast communication signal. In some embodiments, wherein the one or more random access resources are outside of the discovery time period. In some embodiments, wherein the first broadcast communication signal further indicates a beam direction for each of the one or more random access resources. In some embodiments, wherein the first broadcast communication signal is communicated in a first beam direction, and wherein the request is communicated using a first resource of the one or more random access resources corresponding to the first beam direction. In some embodiments, the apparatus further comprises means for allocating the one or more random access resources for communicating the request for the second broadcast communication signal. In some embodiments, wherein the means for communicating the request is further configured to transmit, to the wireless communication device, the request when there is no second broadcast communication signal detected within the discovery time period. In some embodiments, wherein the first broadcast communication signal includes an expiration period for monitoring for the second broadcast communication signal in the discovery time period. In some embodiments, wherein the means for communicating the request is further configured to transmit, to the wireless communication device, the request when there is no second broadcast communication signal detected within the expiration period. In some embodiments, wherein the means for communicating the request is further configured to transmit, to the wireless communication device, the request for the second broadcast communication signal, and wherein the means for communicating the second broadcast communication signal is further configured to monitor for the second broadcast communication signal outside of the discovery time period after transmitting the request. In some embodiments, the apparatus further comprises means for performing a listen-before-talk (LBT) in the downlink unlicensed band during the discovery time period; and means for refraining from transmitting the second broadcast communication signal in the downlink unlicensed band during the discovery time period based on the LBT. In some embodiments, wherein the request is communicated in an uplink licensed band. In some embodiments, wherein the request is communicated in an uplink unlicensed band. In some embodiments, wherein the first broadcast communication signal includes a synchronization signal block (SSB), and wherein the second broadcast communication signal includes remaining system information (RMSI).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
communicating, by a first wireless communication device with a second wireless communication device in a downlink unlicensed band, a first broadcast communication signal during a discovery time period configured based on a network discovery configuration, the first broadcast communication signal indicating a second broadcast communication signal is scheduled to be transmitted within the discovery time period and including a configuration for requesting the second broadcast communication signal when there is no second broadcast communication signal detected within the discovery time period;
communicating, by the first wireless communication device with the second wireless communication device, a request for the second broadcast communication signal based on the configuration; and
communicating, by the first wireless communication device with the second wireless communication device in the downlink unlicensed band, the second broadcast communication signal outside of the discovery time period in response to the request.

2. The method of claim 1, wherein the configuration indicates one or more random access resources for communicating the request for the second broadcast communication signal.

3. The method of claim 2, wherein the one or more random access resources are outside of the discovery time period.

4. The method of claim 2, wherein the first broadcast communication signal further indicates a beam direction for each of the one or more random access resources, wherein the first broadcast communication signal is communicated in a first beam direction, and wherein the request is communicated using a first resource of the one or more random access resources corresponding to the first beam direction.

5. The method of claim 2, further comprising:
allocating, by the first wireless communication device, the one or more random access resources for communicating the request for the second broadcast communication signal.

6. The method of claim 1, wherein the communicating the request includes:
transmitting, by the first wireless communication device to the second wireless communication device, the request when there is no second broadcast communication signal detected within the discovery time period.

7. The method of claim 1, wherein the first broadcast communication signal includes an expiration period for monitoring for the second broadcast communication signal in the discovery time period, and wherein the communicating the request includes:
transmitting, by the first wireless communication device to the second wireless communication device, the request when there is no second broadcast communication signal detected within the expiration period.

8. The method of claim 1, wherein:
the communicating the request includes:
transmitting, by the first wireless communication device to the second wireless communication device, the request for the second broadcast communication signal, and the communicating the second broadcast communication signal includes:
monitoring, by the first wireless communication device, for the second broadcast communication signal outside of the discovery time period after transmitting the request.

9. The method of claim 1, further comprising:
performing, by the first wireless communication device, a listen-before-talk (LBT) in the downlink unlicensed band during the discovery time period; and
refraining, by the first wireless communication device, from transmitting the second broadcast communication signal in the downlink unlicensed band during the discovery time period based on the LBT.

10. The method of claim 1, wherein the request is communicated in at least one of an uplink licensed band or an uplink unlicensed band.

11. The method of claim 1, wherein the first broadcast communication signal includes a synchronization signal block (SSB), and wherein the second broadcast communication signal includes remaining system information (RMSI).

12. An apparatus comprising:
a transceiver configured to:
communicate, with a wireless communication device in a downlink unlicensed band, a first broadcast communication signal during a discovery time period configured based on a network discovery configuration, the first broadcast communication signal indicating a second broadcast communication signal is scheduled to be transmitted within the discovery time period and including a configuration for requesting the second broadcast communication signal when there is no second broadcast communication signal detected within the discovery time period;
communicate, with the wireless communication device, a request for the second broadcast communication signal based on the configuration; and
communicate, with the wireless communication device in the downlink unlicensed band, the second broadcast communication signal outside of the discovery time period in response to the request.

13. The apparatus of claim 12, wherein the configuration indicates one or more random access resources for communicating the request for the second broadcast communication signal.

14. The apparatus of claim 13, wherein the one or more random access resources are outside of the discovery time period.

15. The apparatus of claim 13, wherein the first broadcast communication signal further indicates a beam direction for each of the one or more random access resources, wherein the first broadcast communication signal is communicated in a first beam direction, and wherein the request is communicated using a first resource of the one or more random access resources corresponding to the first beam direction.

16. The apparatus of claim 13, further comprising:
a processor configured to allocate the one or more random access resources for communicating the request for the second broadcast communication signal.

17. The apparatus of claim 12, wherein the transceiver configured to communicate the request is further configured to:
transmit, to the wireless communication device, the request when there is no second broadcast communication signal detected within the discovery time period.

18. The apparatus of claim 12, wherein the first broadcast communication signal includes an expiration period for monitoring for the second broadcast communication signal in the discovery time period, and wherein the transceiver configured to communicate the request is further configured to:
transmit, to the wireless communication device, the request when there is no second broadcast communication signal detected within the expiration period.

19. The apparatus of claim 12, wherein the transceiver configured to communicate the request is further configured to:
transmit, to the wireless communication device, the request for the second broadcast communication signal, and
wherein the apparatus further comprises a processor configured to monitor for the second broadcast communication signal outside of the discovery time period after transmitting the request.

20. The apparatus of claim 12, further comprising a processor configured to:
perform a listen-before-talk (LBT) in the downlink unlicensed band during the discovery time period; and
refrain from transmitting the second broadcast communication signal in the downlink unlicensed band during the discovery time period based on the LBT.

21. The apparatus of claim 12, wherein the request is communicated in at least one of an uplink licensed band or an uplink unlicensed band.

22. The apparatus of claim 12, wherein the first broadcast communication signal includes a synchronization signal block (SSB), and wherein the second broadcast communication signal includes remaining system information (RMSI).

23. A non-transitory computer-readable medium having program code recorded thereon, the program code comprising:
 code for causing a wireless communication device to communicate, with a second wireless communication device in a downlink unlicensed band, a first broadcast communication signal during a discovery time period configured based on a network discovery configuration, the first broadcast communication signal indicating that a second broadcast communication signal is scheduled to be transmitted within the discovery time period and including a configuration for requesting the second broadcast communication signal when there is no second broadcast communication signal detected within the discovery time period;
 code for causing the wireless communication device to communicate, with the second wireless communication device, a request for the second broadcast communication signal based on the configuration; and
 code for causing the wireless communication device to communicate, with the second wireless communication device in the downlink unlicensed band, the second broadcast communication signal outside of the discovery time period in response to the request.

24. The non-transitory computer-readable medium of claim 23, wherein the configuration indicates one or more random access resources for communicating the request for the second broadcast communication signal.

25. The non-transitory computer-readable medium of claim 24, wherein the one or more random access resources are outside of the discovery time period.

26. The non-transitory computer-readable medium of claim 24, wherein the first broadcast communication signal further indicates a beam direction for each of the one or more random access resources, wherein the first broadcast communication signal is communicated in a first beam direction, and wherein the request is communicated using a first resource of the one or more random access resources corresponding to the first beam direction.

27. The non-transitory computer-readable medium of claim 24, further comprising:
 code for causing the wireless communication device to allocate the one or more random access resources for communicating the request for the second broadcast communication signal.

28. The non-transitory computer-readable medium of claim 23, wherein the code for causing the wireless communication device to communicate the request is further configured to:
 transmit, to the second wireless communication device, the request when there is no second broadcast communication signal detected within the discovery time period.

29. The non-transitory computer-readable medium of claim 23, wherein the first broadcast communication signal includes an expiration period for monitoring for the second broadcast communication signal in the discovery time period, and wherein the code for causing the wireless communication device to communicate the request is further configured to:
 transmit, to the second wireless communication device, the request when there is no second broadcast communication signal detected within the expiration period.

30. The non-transitory computer-readable medium of claim 23, wherein the code for causing the wireless communication device to communicate the request is further configured to:
 transmit, to the second wireless communication device, the request for the second broadcast communication signal, and
 wherein the code for causing the wireless communication device to communicate the second broadcast communication signal is further configured to:
 monitor for the second broadcast communication signal outside of the discovery time period after transmitting the request.

* * * * *